United States Patent
Goodbread et al.

(10) Patent No.: US 11,125,668 B2
(45) Date of Patent: Sep. 21, 2021

(54) RESONANT SENSORS FOR MEASURING FLUID PROPERTIES CAPABLE OF OPERATING AT HIGH TEMPERATURES AND PRESSURES

(71) Applicant: RHEONICS GMBH, Winterthur (CH)

(72) Inventors: Joseph H. Goodbread, Winterthur (CH); Sunil Kumar, Winterthur (CH); Klaus Haeusler, Zurich (CH); Bernhard Zybach, Uhwiesen (CH)

(73) Assignee: RHEONICS GMBH, Winterthur (CH)

( * ) Notice: Subject to any disclaimer, the term of this patent is extended or adjusted under 35 U.S.C. 154(b) by 84 days.

(21) Appl. No.: 16/470,884

(22) PCT Filed: Dec. 19, 2016

(86) PCT No.: PCT/US2016/067557
§ 371 (c)(1),
(2) Date: Jun. 18, 2019

(87) PCT Pub. No.: WO2018/118011
PCT Pub. Date: Jun. 28, 2018

(65) Prior Publication Data
US 2020/0088619 A1    Mar. 19, 2020

(51) Int. Cl.
*G01N 11/16* (2006.01)
*G01N 9/34* (2006.01)

(52) U.S. Cl.
CPC .............. *G01N 9/34* (2013.01); *G01N 11/162* (2013.01)

(58) Field of Classification Search
CPC ........ G01N 9/34; G01N 11/162; G01N 9/002; G01N 2009/008; G01N 11/16
(Continued)

(56) References Cited

U.S. PATENT DOCUMENTS 3,690,147 A * 9/1972 Kuenzler ................ G01N 9/002
73/32 A
5,723,771 A * 3/1998 Miura .................. G01N 11/162
73/54.24
(Continued)

FOREIGN PATENT DOCUMENTS

WO    2012012508 A2    1/2012
WO    2014138150 A1    9/2014
WO    2016168842 A1    10/2016

*Primary Examiner* — Robert R Raevis
(74) *Attorney, Agent, or Firm* — Timothy E. Siegel Patent Law, PLLC; Timothy E. Siegel

(57) ABSTRACT

A resonant sensor 1908 is used to determine fluid properties, the resonant sensor 1908 comprising a resonator 108 defining a lengthwise axis and having a central vibrational node (140), and a pair of opposed lengthwise end-portions (125); a support structure including a frame (115) and a set of flexible supports (110) extending from the frame to the central vibrational node and thereby supporting the resonator at the lengthwise midpoint; a driving and sensing assembly, adapted to drive the resonator to resonant motion and to sense resultant motion of the resonator and producing a motion sensed signal, responsive thereto; and a control and signal processing network adapted to control the driving and sensing assembly to drive the lengthwise end-portions in rotation about the lengthwise axis, in opposed rotational directions, and responsive to the motion sensed signal to determine at least one fluid property of a fluid under test in response to the motion sensed signal.

24 Claims, 20 Drawing Sheets

(58) Field of Classification Search
USPC ............ 73/32 A, 19.03, 24.02, 24.04, 24.05, 73/24.06, 30.01, 54.41, 61.49
See application file for complete search history.

(56) References Cited

U.S. PATENT DOCUMENTS

| | | | |
|---|---|---|---|
| 6,450,013 B1 * | 9/2002 | Gallagher | G01H 1/10 |
| | | | 73/24.06 |
| 6,971,262 B1 * | 12/2005 | Marchal | B01F 7/1675 |
| | | | 73/514.15 |
| 7,222,671 B2 | 5/2007 | Cadwell et al. | |
| 2013/0167620 A1 * | 7/2013 | Haeusler | G01N 11/162 |
| | | | 73/54.41 |
| 2015/0082873 A1 | 3/2015 | Goodbread | |

* cited by examiner

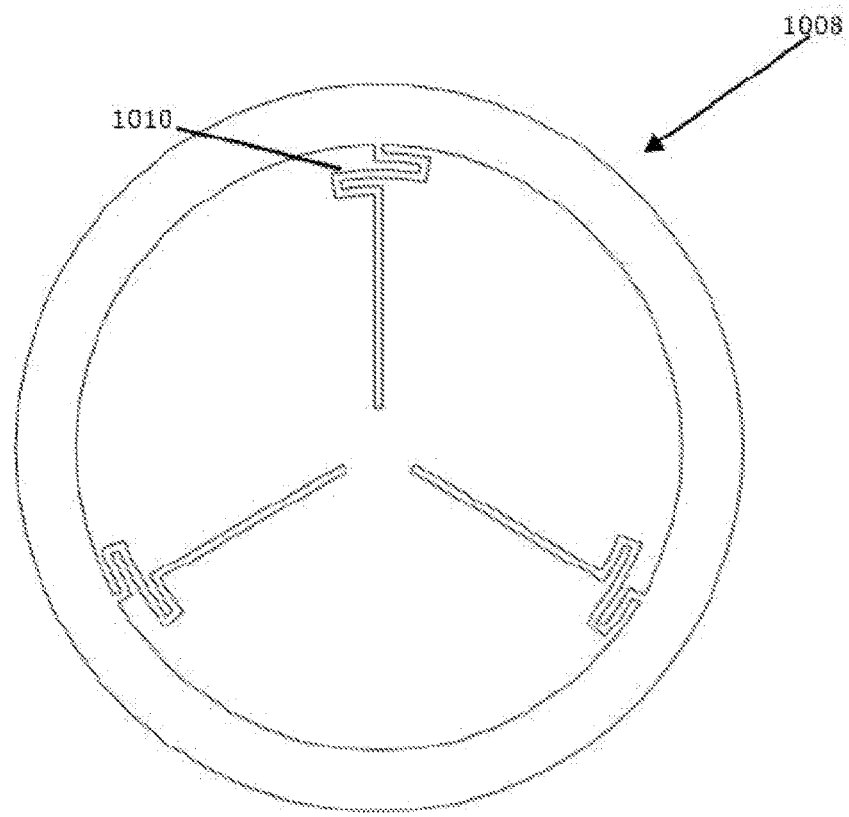
FIG. 10
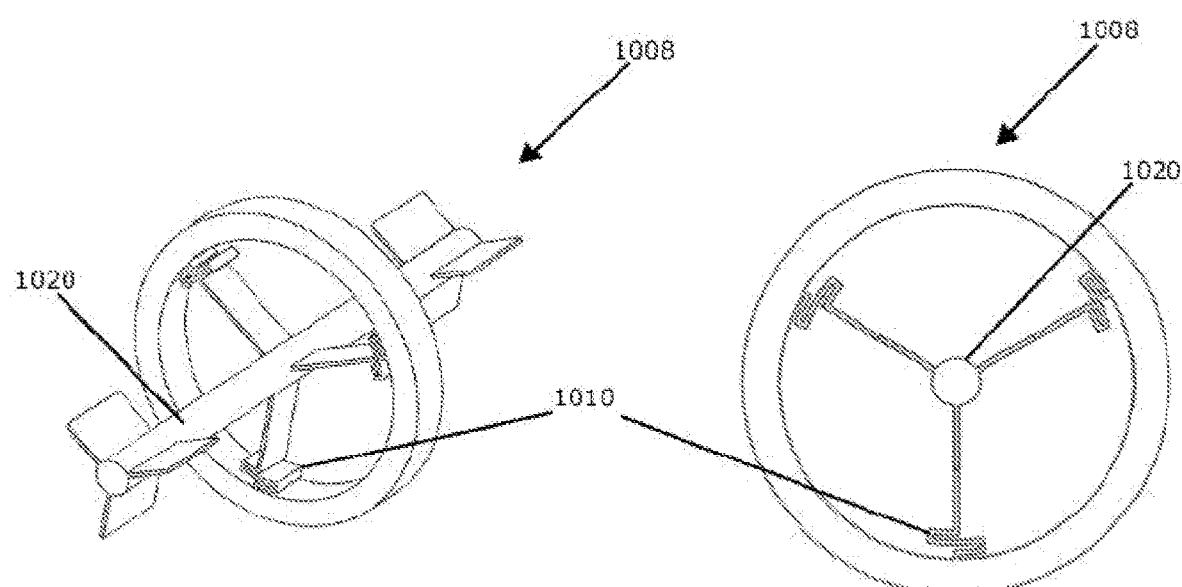
FIG. 11A
FIG. 11B

RESONANT SENSORS FOR MEASURING FLUID PROPERTIES CAPABLE OF OPERATING AT HIGH TEMPERATURES AND PRESSURES

FIELD OF INVENTION

The field of the invention is the measurement of fluid properties.

BACKGROUND ART

In petroleum exploration, drilling and production, it is often necessary to characterize downhole fluids. Characterization includes measurement of viscosity and density, but may also extend to properties such as water cut (ratio of oil to water), corrosiveness, and tendency to deposit scale, waste, or asphaltenes on piping and other equipment. Sensors to perform this characterization must perform at temperatures up to 200° C., and pressures in excess of 1000 bars.

Resonant sensors for use in characterizing downhole fluids are known. Each has certain characteristics that limit its usefulness.

More generally, a known problem in designing resonant sensors for fluid properties measurement is to minimize or eliminate the effects of mounting or anchoring the resonator on the accuracy and repeatability of measurements.

Resonant sensors depend on comparing their resonant characteristics when immersed in a fluid, principally their resonant frequency and damping, to their characteristics when vibrating in a vacuum. The sensors resonant frequency and damping in a vacuum are dependent on:

1) Elastic modulus as a function of temperature
2) Intrinsic (material) damping, which is itself a function of temperature
3) Anchor, or mounting effects, which can influence both the resonant frequency and the damping of the resonator Material damping effects may be minimized by selecting a material for the resonator whose properties are a function only of its present temperature and independent of its temperature history. The elastic modulus and material damping must be free of hysteresis. A resonator that is heated from room temperature to, say, 200° C. and back to room temperature must return to its former values of frequency and damping to be considered free from hysteresis.

Anchor effects describe the change in frequency and damping of the resonator in response to changes in mounting conditions. Whenever a resonator is mounted to a physical support, a certain amount of energy flows from the resonator to the support, which results in the resonator being more highly damped. If the effects of a mounting method are predictable, particularly as a function of temperature, then the mounting effects can be considered negligible, as they can be completely accounted for as long as the temperature of the system is known.

Known mounting methods attempt to minimize mounting losses per the type of resonator being used. Known resonators are of two general categories, unbalanced and balanced. Unbalanced resonators for downhole fluid measurements include the vibrating wire resonator, in which a thin wire under constant tension is made to vibrate, and its resonant frequency and damping are measured as in U.S. Pat. No. 7,222,671. Because the center of mass of the wire vibrates transversely, the wire must be anchored in a massive mounting structure, or, alternatively, the wire must be made very thin. This makes the wire very delicate and subject to breakage. Also, the tension on the wire is dependent on the thermal expansion of the mounting, which must include a means for electrically insulating the clamps on the two ends of the wire from each other. This composite structure must have absolutely predictable and hysteresis-free expansion and contraction in order that the baseline characteristics of the vibrating wire are known. Other known unbalanced resonators that require massive mounting structures include unbalanced torsional resonators as in U.S. Pat. No. 3,712,117 and transversely oscillating unbalanced structures, as in European Patent No. EP2045594A1.

Alternatively, the resonator may be vibrationally balanced, in that there exists a node whose position is independent of the damping and mass loading effects of the fluid in which the resonator is immersed. If the resonator is supported by a structure that is placed at or symmetrically near to its node, then the damping and loading effects of the support structure become negligible, particularly in regard to thermal hysteresis.

Prior art balanced resonators are known, such as that disclosed in International Publication No. WO2012012508 A3, in which the balancing is achieved by coupling together two torsional resonators by means of a coupling bridge, and isolating the coupled resonators assembly from the resonator mounting structure by means of a compliant neck. This complex structure is necessary because the two individual torsional resonators have differing resonant frequencies due to manufacturing tolerances, and without proper precautions, will have two slightly separated resonant frequencies which make detection of their damping and resonant frequencies difficult if not impossible. In addition, when the assembly resonates as two independent resonators, substantial reaction torques will be transmitted to the mounting structure resulting in non-negligible energy leakage and unpredictable effects on the damping and resonant frequency, particularly as temperature and hydrostatic pressure vary. This necessitates manufacturing the assembly to very tight tolerances, making it costly in comparison to resonators that do not depend on such high precision to remain vibrationally balanced. A further disadvantage of the coupled torsional resonators disclosed in International Publication No. WO2012012508 A3 is that the resonant assembly possesses two closely spaced vibrational modes, the desired one of which is mirror symmetric, in that both resonators vibrate in opposite directions, balancing each others'torques and leading to a nominal balanced structure. The undesirable mode is antisymmetric, with both resonators vibrating in the same direction, exerting a net torque on the mounting structure, and making it susceptible to varying damping and mass loading effects due to mounting forces and temperature changes. The signal processing and transducer assemblies must be designed to explicitly reject this antisymmetric mode while preserving the mirror-symmetric mode.

SUMMARY

The present application describes a method of making fluid properties sensors that are immune to the difficulties as described above, as well as a series of preferred embodiments that make these methods particularly applicable to specific measurement challenges.

In a first separate aspect, the present invention may take the form of a fluid properties measurement device. The device includes a resonator defining a lengthwise axis and having a central vibrational node, and a pair of opposed lengthwise end-portions. Also, a support structure is included with a frame and a set of flexible supports extending from the frame to the lengthwise midpoint of the resonator and thereby supporting the resonator at the central vibrational node. In addition, a driving and sensing assembly is adapted to drive the resonator to resonant motion and to sense resultant motion of the resonator, producing a motion sensed signal, responsive thereto. Finally, a control and signal processing network is adapted to control the driving and sensing assembly to drive the lengthwise end-portions in rotation about the lengthwise axis, in opposed rotational directions, responsive to the motion sensed signal for the determination of at least one fluid property of a fluid under test in response to the motion sensed signal.

In a second separate aspect, the present invention may take the form of a method of measuring a fluid property, utilizing a measurement assembly, including a resonator having a pair of opposed lengthwise end-portions joined together by a torsional spring and defining a lengthwise axis and having a lengthwise midpoint that is also a vibrational node; and a support structure including a frame and a set of flexible supports extending from the frame to the lengthwise midpoint of the resonator, thereby supporting the resonator at the central vibrational node. In the method, the measurement assembly may be placed into a fluid, driving the end-portions in rotation about the lengthwise axis, in opposed rotational directions and sensing resultant resonator motion and producing a motion sensed signal, responsive thereto; and using the motion sensed signal to determine at least one fluid property of the fluid.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 10 shows a side view of an alternate embodiment of mounting ring supporting mounting springs, each spring having a serpentine portion.

FIG. 11A shows an isometric view of a resonator mounted in a mounting ring with the springs shown in FIG. 10.

FIG. 11B shows an end view of the structure of FIG. 11A.

PREFERRED MODES OF CARRYING OUT THE INVENTION

Definition: as used in this application a set can have only a single element, or multiple elements.

Figure 1:
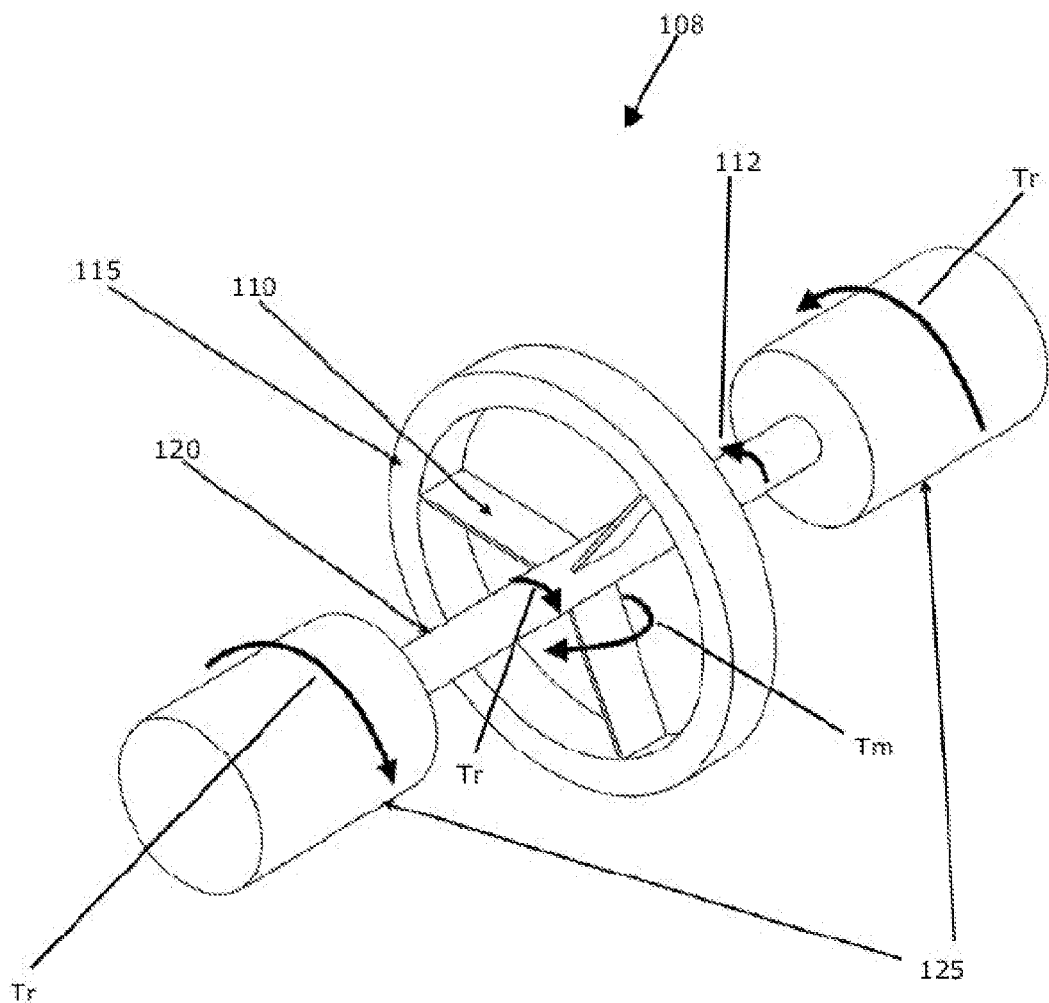
FIG. 1 shows an isometric view of first preferred embodiment of a resonant element supported by a mounting ring.

A first preferred embodiment for preferentially measuring the viscosity of a fluid consists of the resonator shown in FIG. 1.

Referring to FIG. 1, a first embodiment of a mounted resonator 108, includes a resonator 112, mounted to a rigid fixation ring 115 by means of mounting springs 110, which support the resonator 112 and a central vibrational node. Resonator 112 includes a cylindrical torsion spring 120 with torsional inertial masses 125 fixed to its two ends. The torsion spring 120 is supported by its surrounding structure—here depicted as a massive, rigid fixation ring 115 which itself may be affixed to a larger supporting structure—by means of three thin leaf springs 110. These mounting leaf springs 110 are torsionally compliant so that their elastic and inertial loading of the torsion spring 120 is negligible, or, as will be shown in further embodiments, predictable in cases where measurement accuracy must be very high.

FIG. 1 is instructive of the basic function of the device, as shown by the heavy, curved arrows $T_r$, which indicate that in the preferred vibrational mode, the two end masses twist in opposite directions, so that the torsional displacement of the spring element 120 is zero at its axial midpoint. Torsion of the spring element 120 is further transmitted to the mounting leaf springs 110 as a torsional movement shown by arrow $T_m$, which has a nodal line 140 (FIG. 2) extending to the fixation ring 115. This preferred mode of operation is shown in greater detail in FIG. 2 below. For clarity of presentation, only one supporting mounting leaf spring 110, is shown. The mounting ring 115 is preferably rigidly fixed to a rigid support 115, with the mounting leaf spring 110 turning in an angular motion $T_m$.

Figure 2:
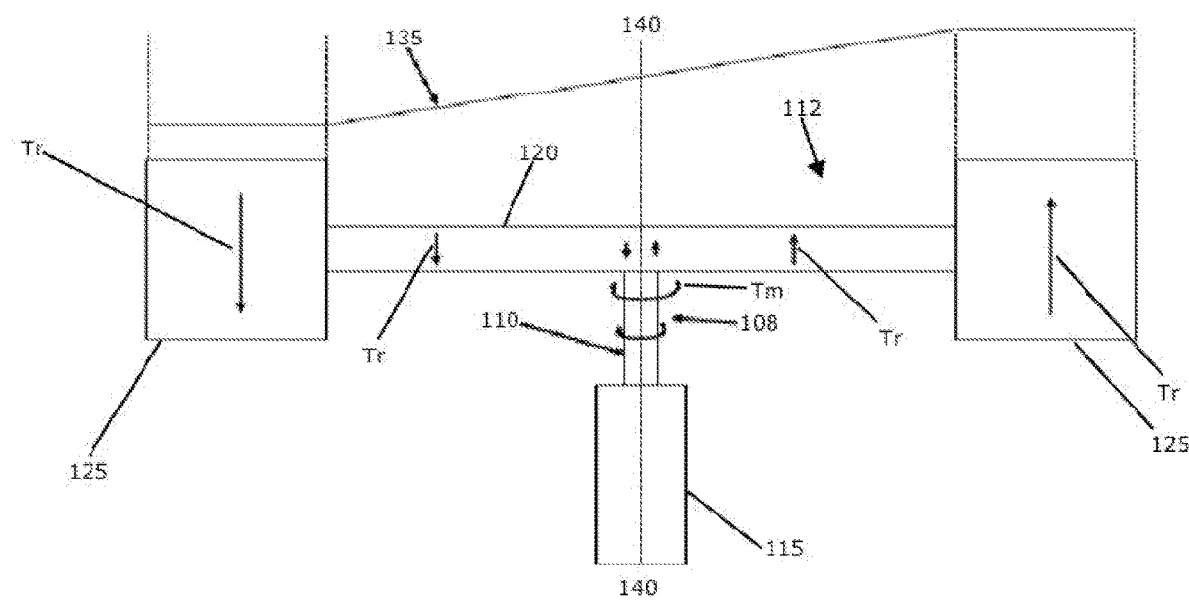
FIG. 2 illustrates a vibrational mode of operation of the resonant element of the resonant element of FIG. 1.

Referring to FIG. 2, the preferred mode is the first antisymmetric torsion mode which is vibrationally balanced with respect to the nodal plane 140, leading to an angular displacement 135 of the torsional masses 125 and torsion spring 120, with the height of the line 135 proportional to the angular displacement in the direction in which the right mass 125 is rotated. The inertial masses 125 in this first embodiment vibrate parallel to their own surfaces, thereby transmitting only shearing forces to the fluid in which it is immersed. This renders it preferentially sensitive to viscous forces. It can be shown that the damping of this resonator is a well-behaved function of the product of the density and viscosity of the fluid.

Figure 3:
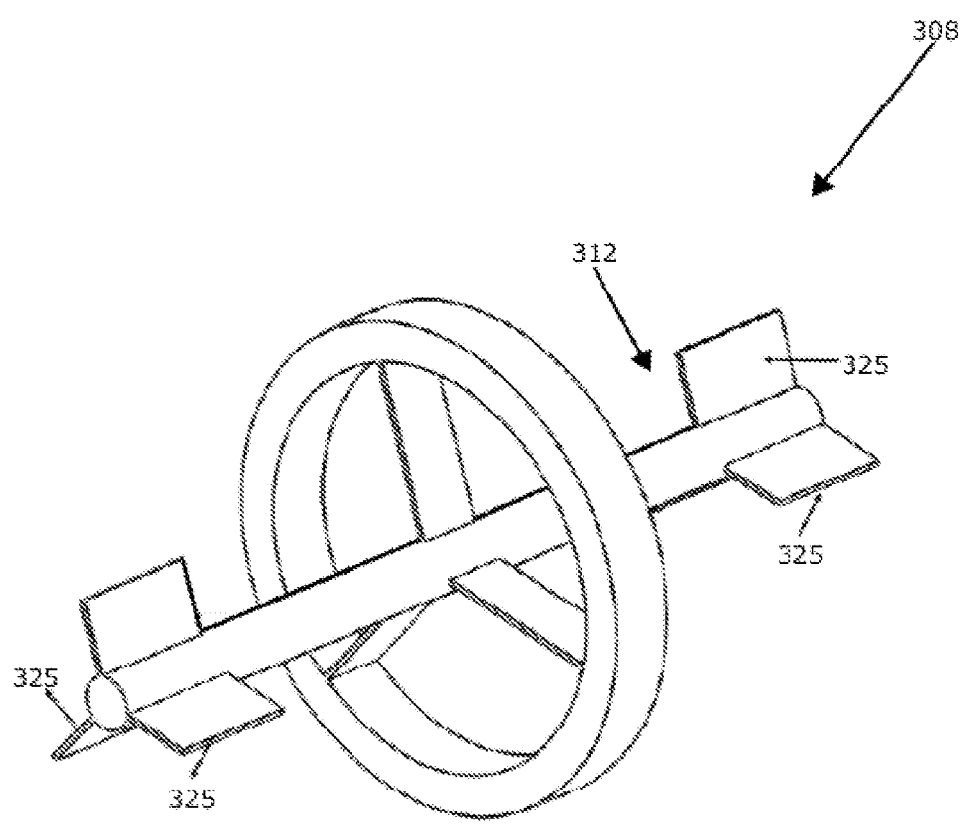
FIG. 3 shows an isometric view of a second preferred embodiment of a resonant element.

In a second preferred embodiment, shown in FIG. 3, the inertial end masses are not of circular cross section but have surfaces that move perpendicularly to themselves when the resonator twists around its central longitudinal axis. The figure shows end masses in the shape of fins 325, that offer a large frontal area to the fluid in which they are immersed, making the resonator preferentially sensitive to the density of the fluid, in addition to being sensitive to its viscosity-density product. Fins 325 displace fluid perpendicularly to their own surfaces, increasing their moment of inertia. This preferred embodiment has several features that can be varied to accommodate varying measurement ranges, fabrication methods and desired resonant characteristics.

Although the fluid ends are shown as having three fins, the number of fins may be varied as long as they are symmetrically disposed around the longitudinal axis of the spring. The minimum number is two, with no theoretical limit on the maximum number. Even numbers are advantageous for certain configurations of electromagnetic transducer means, as explained in the section on transducers. The fins may be of any form, and may be either uniform in thickness or tapered. Two particularly advantageous forms are shown in the following FIGS. 4A and 4B, from the standpoint of ease of machining.

Figure 4A:
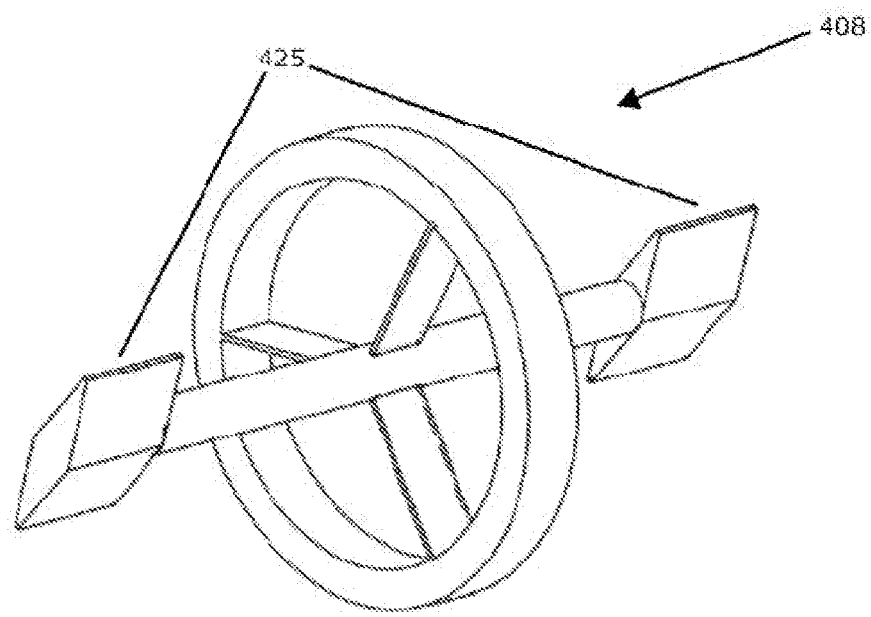
FIG. 4A shows an isometric view of a third preferred embodiment of a resonant element, identical to the embodiment of FIG. 3, but with differently shaped end-mass fins.
Figure 4B:
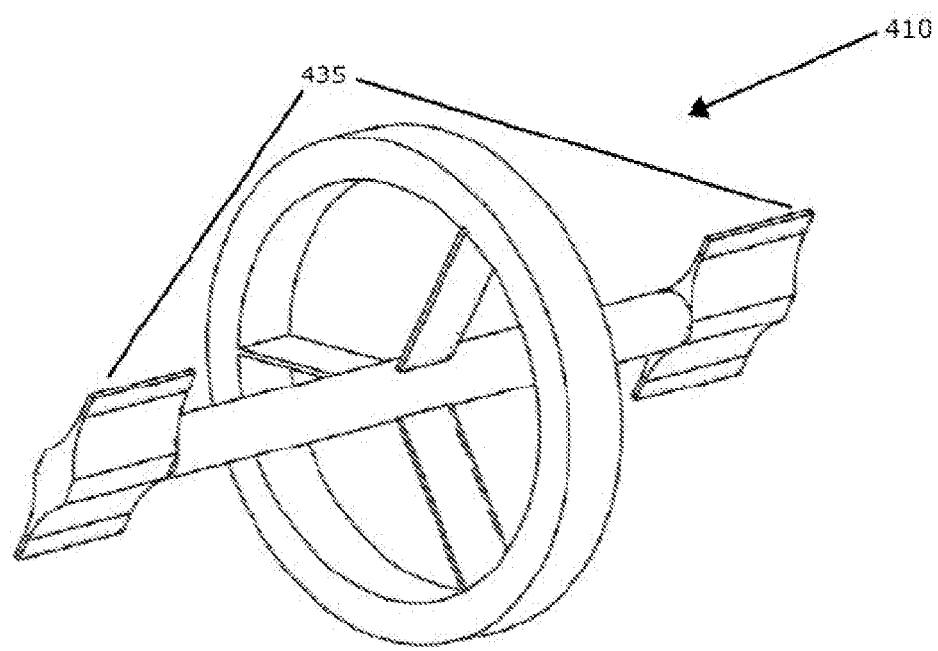
FIG. 4B shows an isometric view of a third preferred embodiment of a resonant element, identical to the embodiments of FIGS. 3 and 4a, but with differently shaped end-mass fins.
Figure 5A:
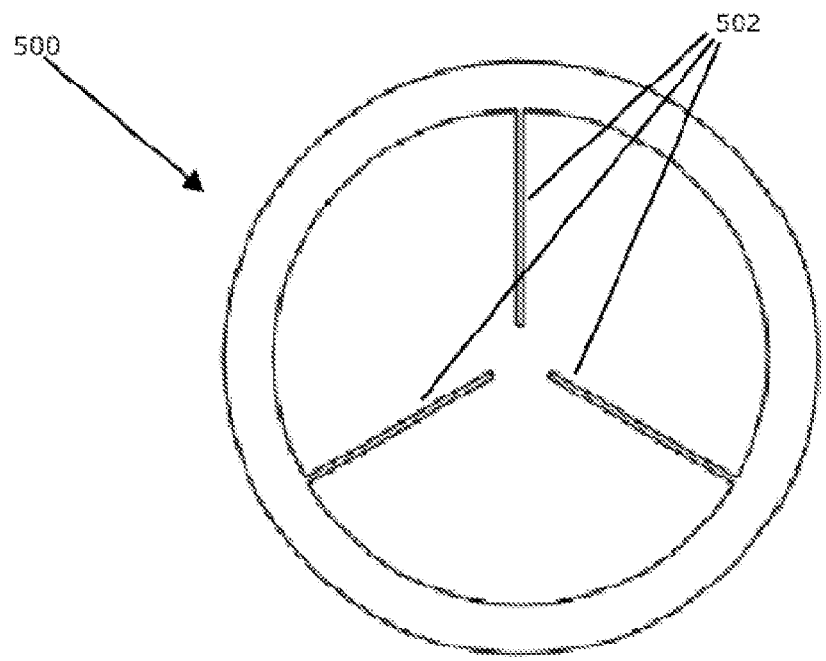
FIGS. 5A-5D show side views of four configurations of mounting leaf springs within a mounting ring.
Figure 5B:
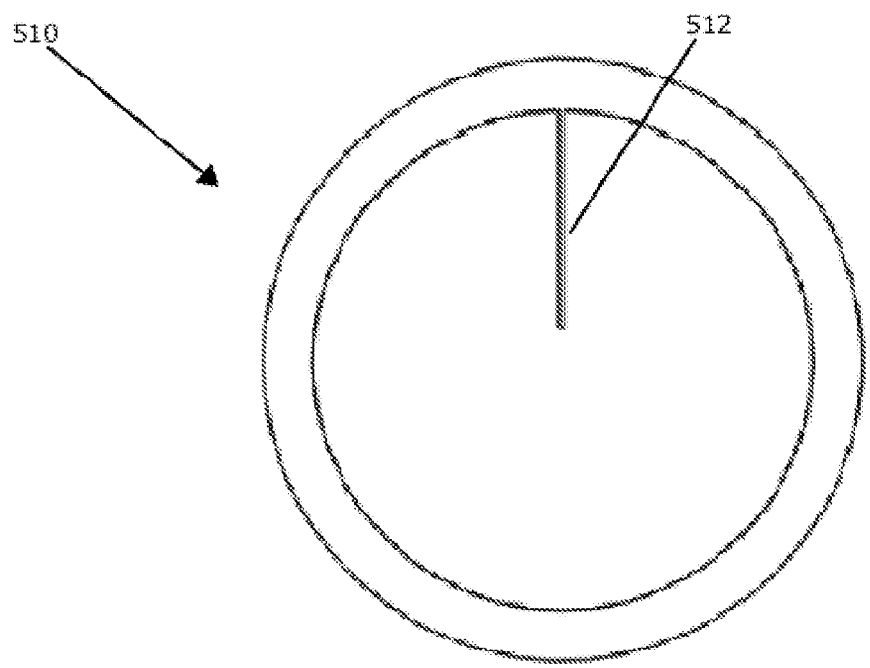
Figure 5C:
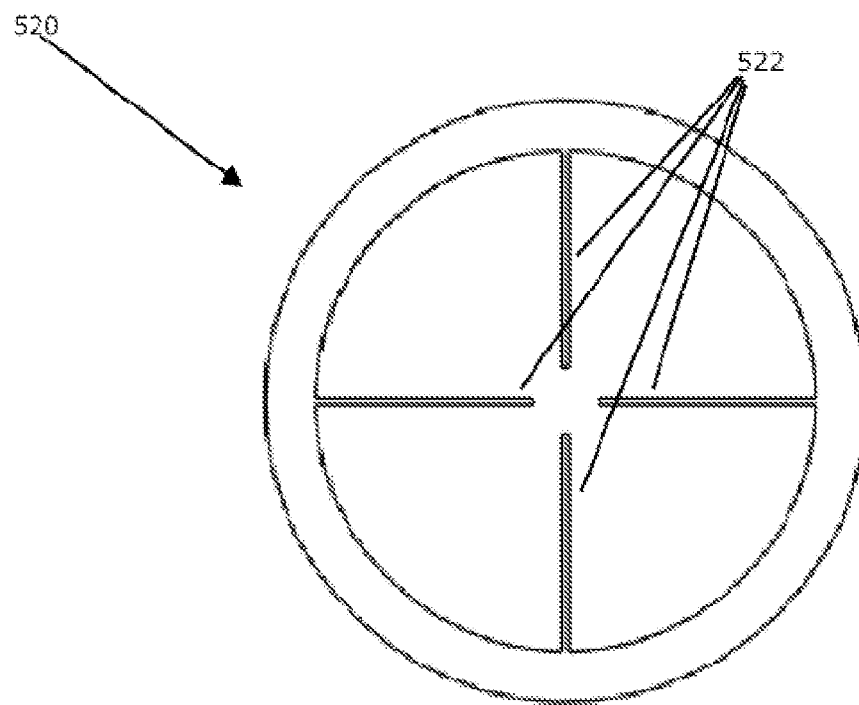
Figure 5D:
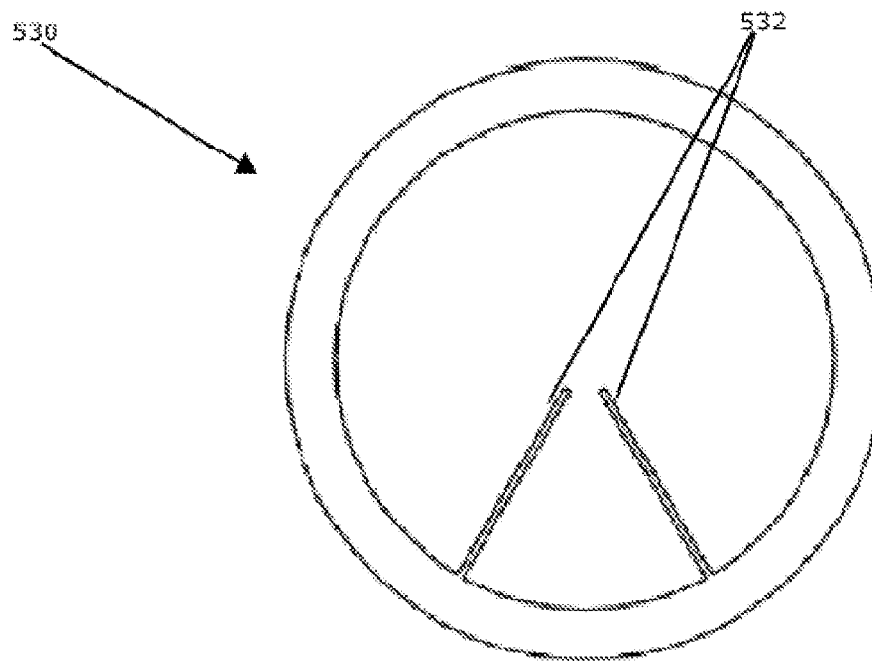

The left-hand drawing, FIG. 4A, shows lozenge-shaped end masses 425, while the right-hand side, FIG. 4B, shows cusped end masses 435. Each has a different ratio of moment of inertia to frontal area, giving a different sensitivity to density for a given resonant frequency.

Figure 6:
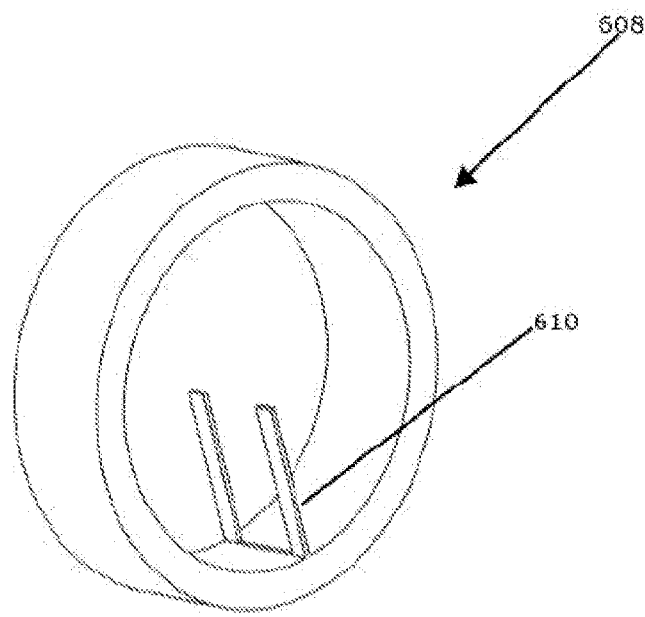
FIG. 6 shows an isometric view of a mounting ring with a single mounting leaf spring from which the center has been removed.

The number and disposition of the mounting springs may also be varied depending on specific requirements. Referring to FIGS. 5A-5D, a variety of configurations is possible. Configuration 510 includes of a single leaf spring 512, which offers minimal obstruction of the fluid channel in which the sensor is mounted, but has the least structural rigidity of the configurations shown here. Configuration 530 is more rigid than 510, and is also minimally obstructive, with just two leaf springs 532. Configurations 500 and 520 are more structurally rigid than 530, offering a combination of open fluid channel and rigidity, with three leaf springs 502 and four leaf springs 522, respectively. Greater structural rigidity is advantageous when flow velocities around the sensor are high, to prevent flutter of the sensor in the flow. The use of one or more leaf springs to mount the resonator is merely illustrative of a wider variety of compliant mounting, including but not limited to configuration 608, shown in FIG. 6, which includes a single leaf spring 610 from which the center has been removed to make it more compliant.

Figure 7A:
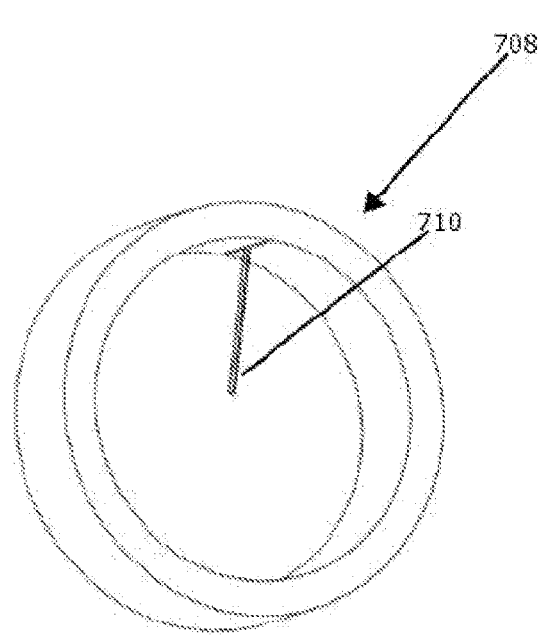
FIGS. 7A-7B show isometric views of two configurations of mounting pins within a mounting ring, one configuration with a one mounting pin and one configuration with two side-by-side mounting pins.
Figure 7B:
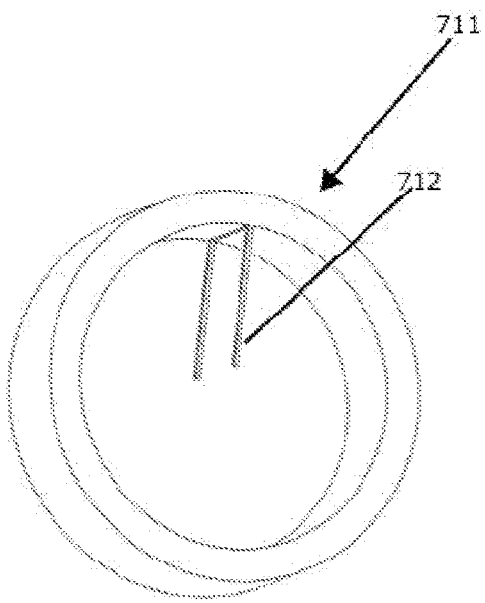

Referring to FIGS. 7A and 7B, other mounting configurations include those using radial pins, such as configuration 708, which uses a one-pin mounting 710 and configuration 711 which uses two side-by-side pins 712. Pins 710 and 712 may be round, rectangular, or more generally cylindrical or prismatic in cross section.

In each of these variant compliant spring mountings, it is understood that any circumferential distribution of one or more radial springs, either uniformly or non-uniformly disposed around the resonator torsional spring 120, may be used, in configurations illustrated by but not limited to those shown in the figures.

Figure 8:
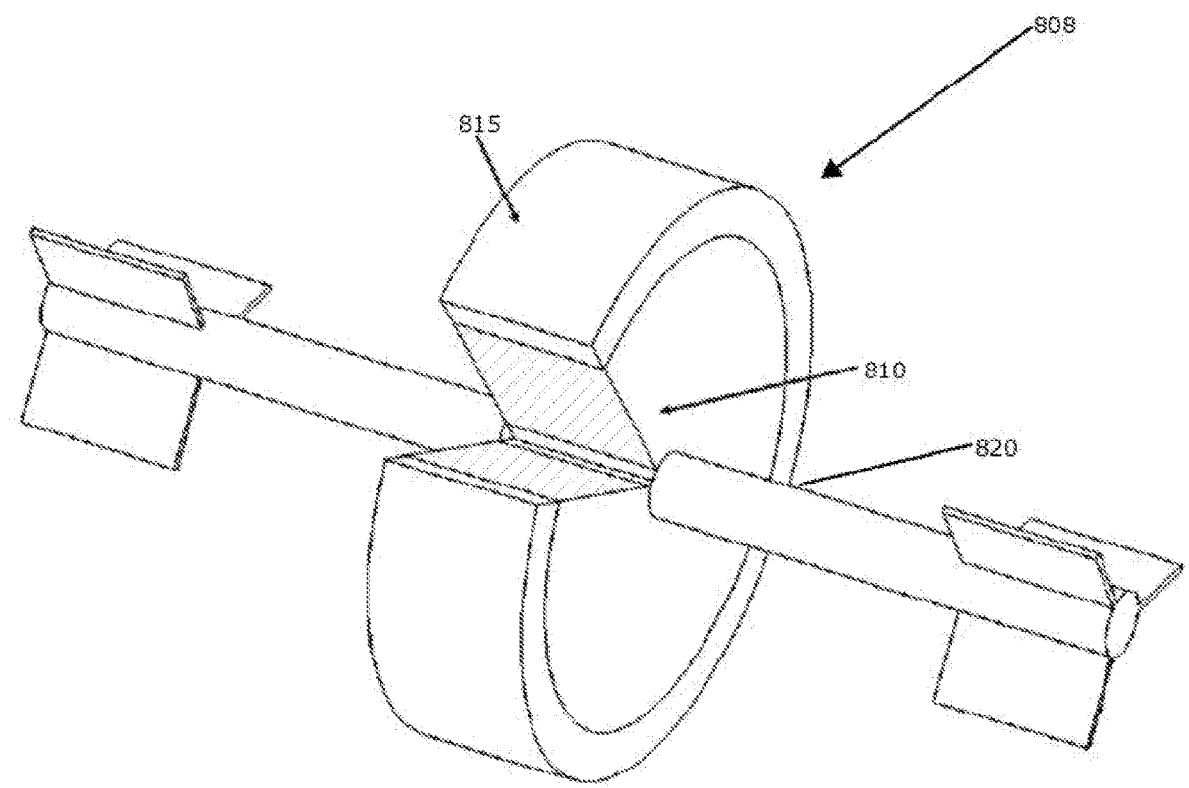
FIG. 8 shows an isometric view alternate embodiment of a resonator mounted in a mounting ring, with the resonator mounted with an elastomeric spring.
Figure 9:
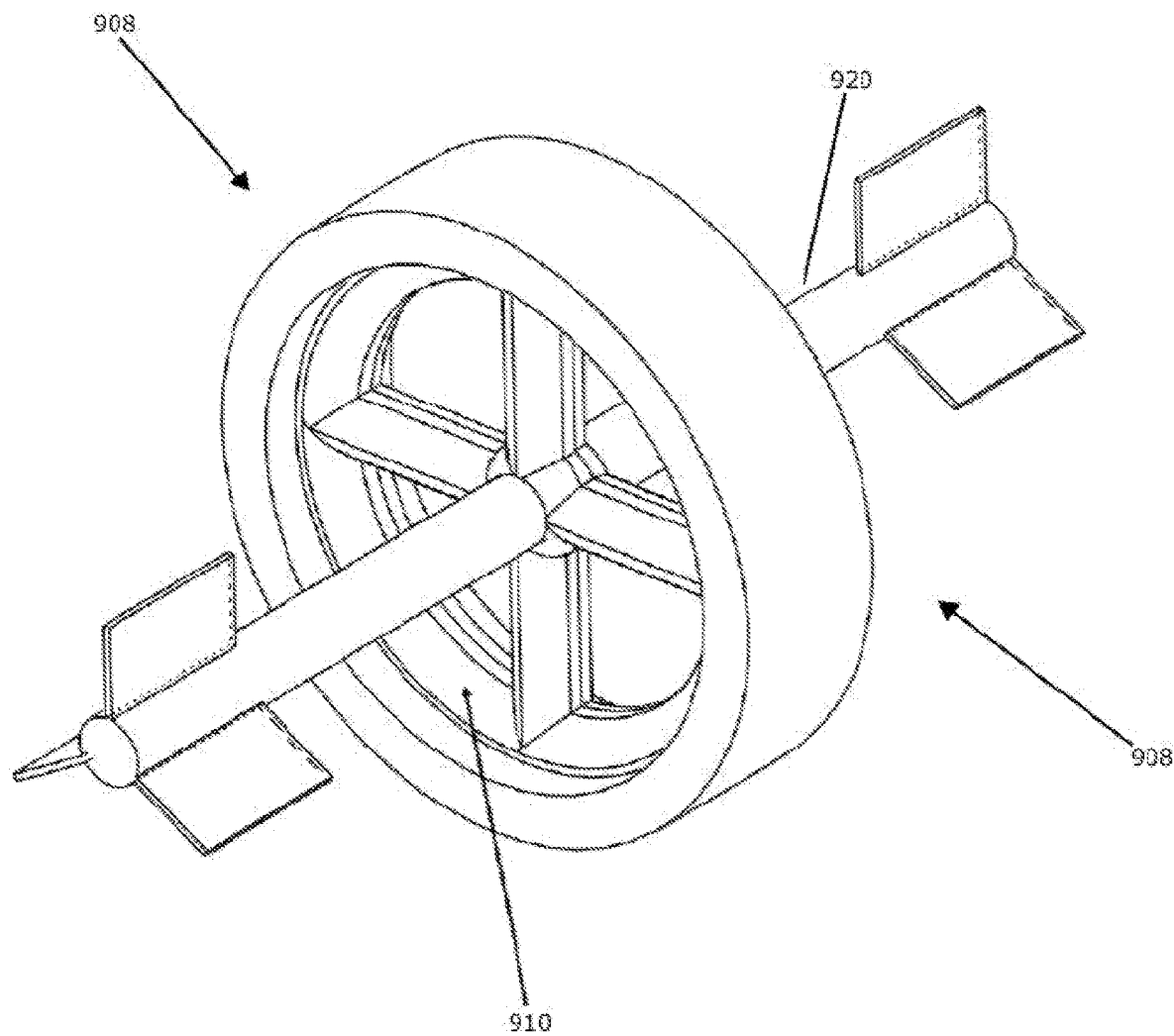
FIG. 9 shows an isometric view of an alternate embodiment of a resonator mounted in a mounting ring, with the resonator mounted with four elastomeric spokes in a rim.

Referring to FIGS. 8 and 9, in configuration 808 the compliant spring or pin mounting is replaced by an elastomeric disk 810 that may be cemented to, or directly vulcanized to the mounting ring 815 and/or the torsional spring 820. In configuration 908, a "spoked wheel" 910 of elastomeric material is used offering enhanced isolation of the resonator 920. Suitable elastomeric materials must be sufficiently compliant and, for downhole uses, must be sufficiently resistant to substances likely to be found in downhole environments. Such materials include but are not limited to perfluoro elastomers such as Viton, having hardness in the range of Shore A 70-90. The support configurations described above may, for sensors of the highest accuracy, suffer from residual sensitivity to radial forces applied to the mounting ring, as through mechanical or thermal stresses on the mounting ring, and the mounting ring support (not shown). Referring to FIGS. 10 and 11A-11B, in a further embodiment 1008, the resonator is further isolated from such effects by the use of serpentine mounting springs 1010. It is understood that a "serpentine" section refers to any modification of a planar suspension spring to include at least one bend, such that a force applied radially to the spring contributes to its flexure, rather than producing buckling forces. In FIG. 10 the resonator is not shown, to more clearly present the serpentine leaf springs 1010, whereas FIGS. 11A and 11B show the torsion spring 1020 mounted by the mounting springs 1010. It is further understood that serpentine springs can be used in any multiples, and can be freely combined with any end mass configurations.

Torsion Spring Configuration

Although the foregoing illustrations have shown the torsion spring as a cylinder of uniform cross section, other configurations are possible, and can be advantageous for certain applications.

Figure 12:
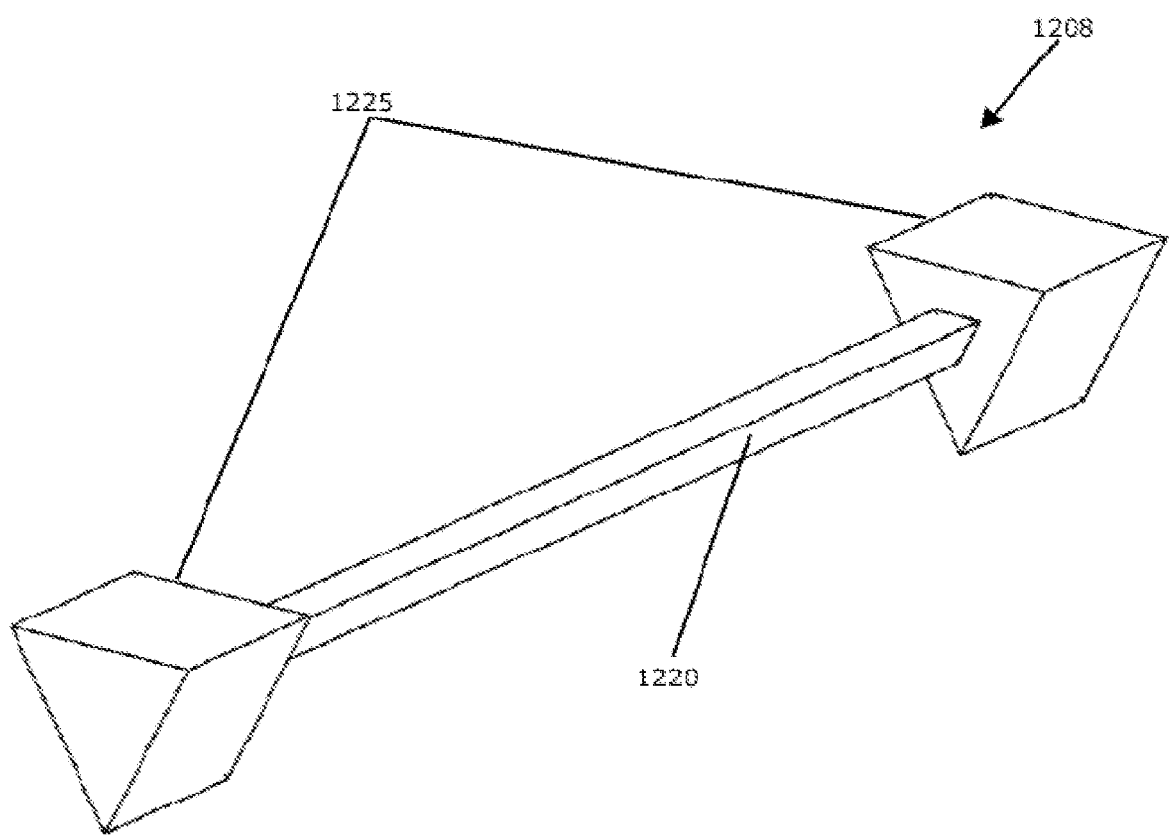
FIG. 12 shows an isometric view of a resonator having a torsion spring and end masses that are triangular in cross-section.

The torsional spring may have a non-circular cross section. Referring to FIG. 12, In a preferred embodiment, the torsion spring 1220 and masses 1225 are triangular in cross-section. Other preferred embodiments include other non-round torsions springs, including square, rectangular, and elliptical in cross section.

Figure 13:
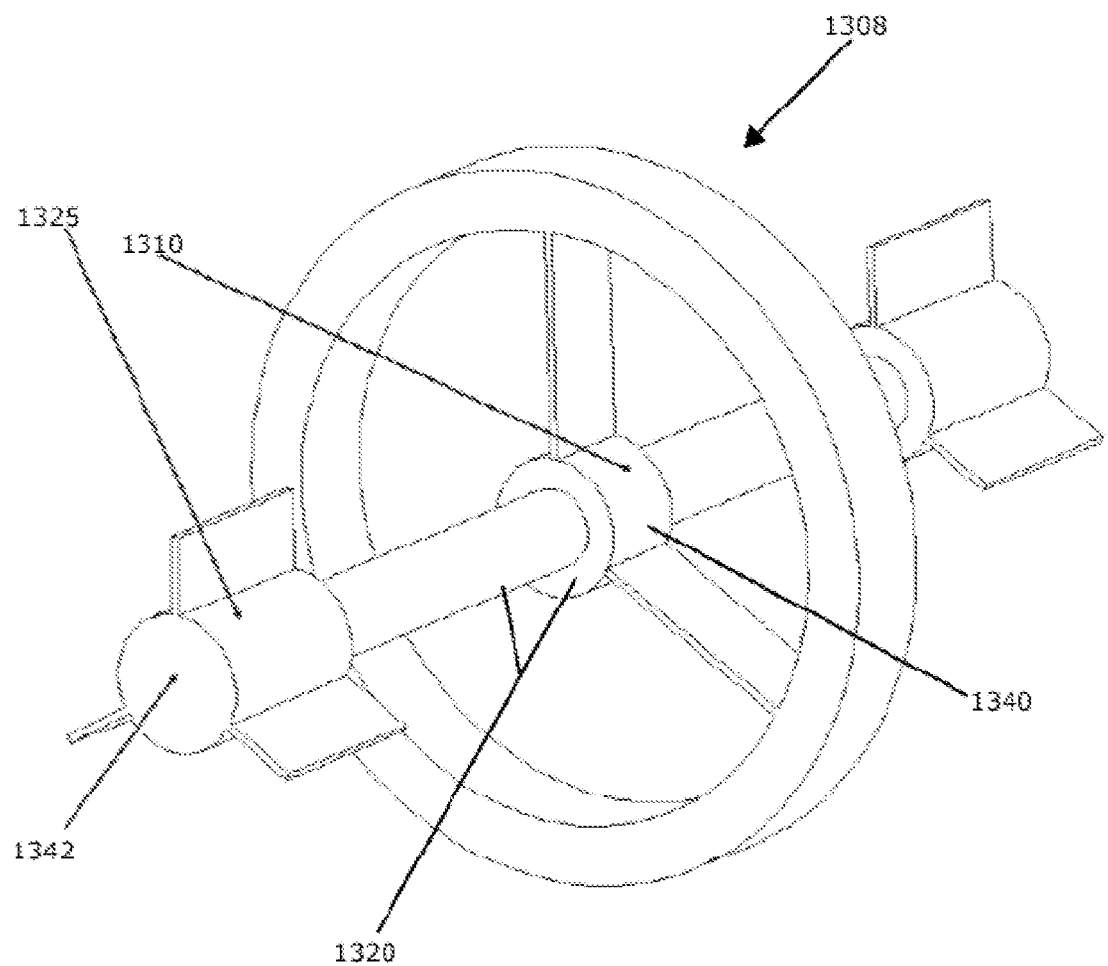
FIG. 13 shows an isometric view of a configuration of a 3-fin, 3-support spring resonator with a reinforced central portion.

Referring to FIG. 13, it is possible to have a mounted resonator 1308, having a torsion spring 1320 that has a non-uniform cross section over its length, such as having sections 1340 of the torsion spring 1320 having increased or decreased radius. Mounted resonator 1308 is a 3-fin, 3-support spring resonator where larger radius section 1340 can be advantageous when it is desired to make the end pieces 1325 have a matching central radius 1342. Making the end pieces of larger radius than the torsional spring can be advantageous when using transduction means that depend on a permanent magnet or soft magnetic material and a larger volume of material than can be contained within the radius of the torsional spring is desired.

Prior art downhole fluid properties sensors rely on either piezoelectric or electromagnetic transducers to excite and sense their resonators. Piezoelectric transducers suffer from the need for high pressure electrical feedthrough connectors which are often unreliable under downhole conditions, as well as the susceptibility of the piezoelectric material to aggressive downhole chemical and physical environments. Known electromagnetic transducers usually employ high-energy permanent magnets which tend to accumulate ferromagnetic debris typically present in downhole fluids, interfering with the function of the resonator. Other known sensors are composed of ferro- or ferrimagnetic materials which are polarized either by an external permanent magnet, or by an electromagnet so that they are then susceptible to the field of excitation coils, and are capable of inducing signals in sensing coils.

Figure 14:
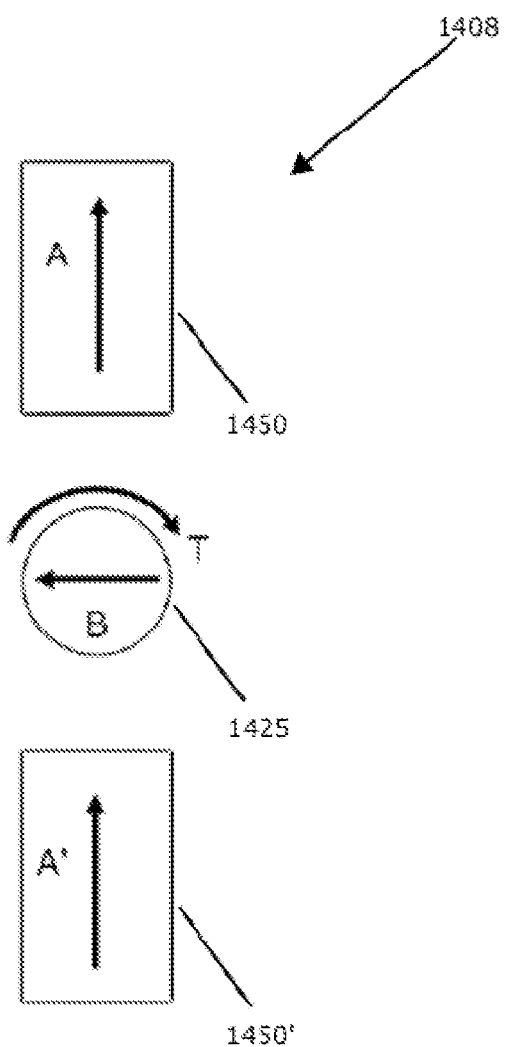
FIG. 14 shows a preferred transducer method for exciting and sensing the resonance of a sensor based on a configuration of magnets.
Figure 17:
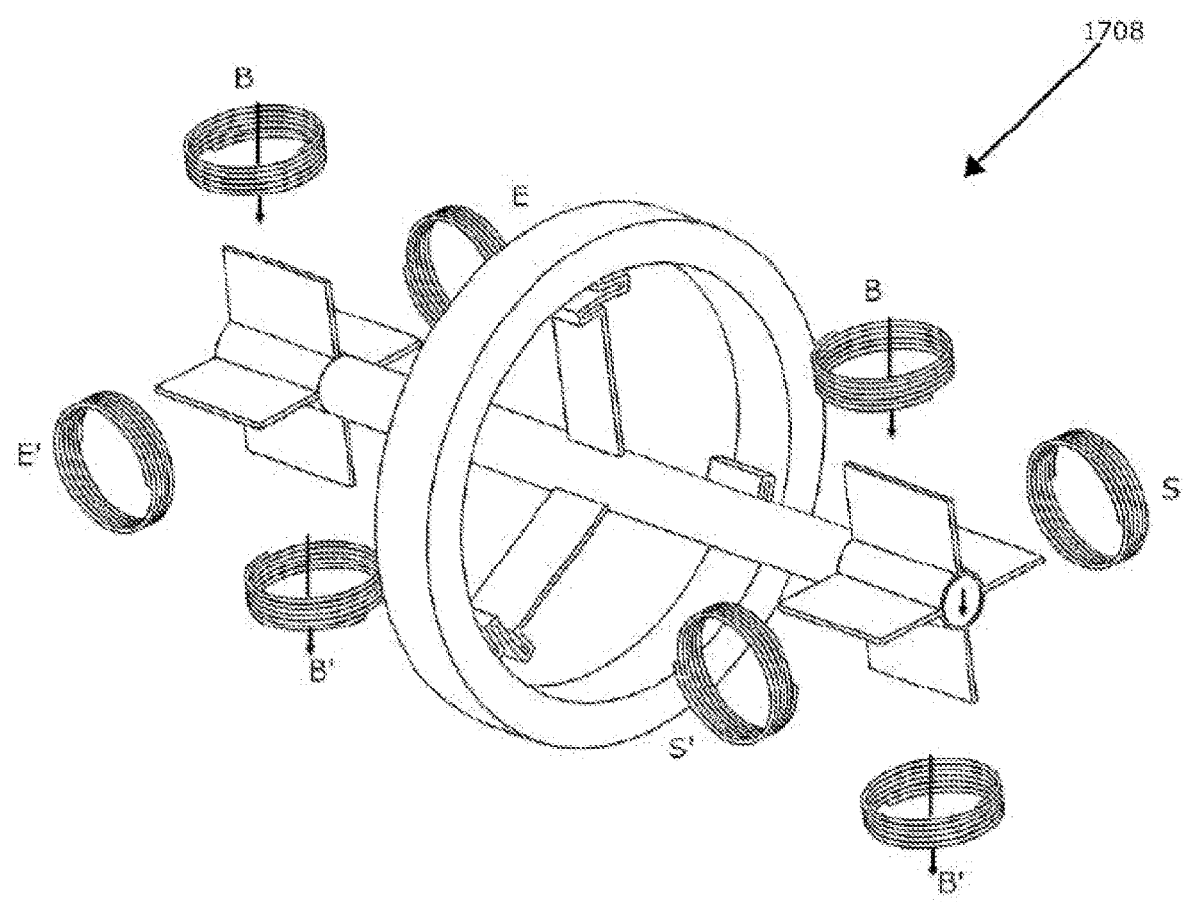
FIG. 17 shows an isometric view of a resonator mounted to a mounting ring, and a set of electromagnets to drive and sense the resonator.

Referring to FIG. 14, a preferred transducer 1408 configured to permit excitation and sensing of the resonance of the resonator utilizes the shown configuration of magnets 1425, 1450 and 1450'. Although at least one of the magnets must be an electromagnet in order to drive the resonator, this could be the magnet 1425, or 1450 and 1450', or those mounted outside of the resonator. In addition, soft magnetic material may be used, most typically for magnet 1425, and maintained in a magnetized state by nearby bias magnets, as shown in FIG. 17 as B and B'.

Magnets 1450 and 1450' are polarized in direction A along their longitudinal axes. These are typically electromagnets, so that the field they produce oscillates in proportion to the current passing through them. Magnet 1425 is polarized in direction B, which is perpendicular to the direction of the field produced by magnets 1450 and 1450'. As a result, magnet 1425 experiences a torque T proportional to its own polarization and to the field A-A'. If 1450 and 1450' are sensing coils, the torsional vibration of B will induce a current in those coils proportional to the vibrational amplitude.

Figure 15:
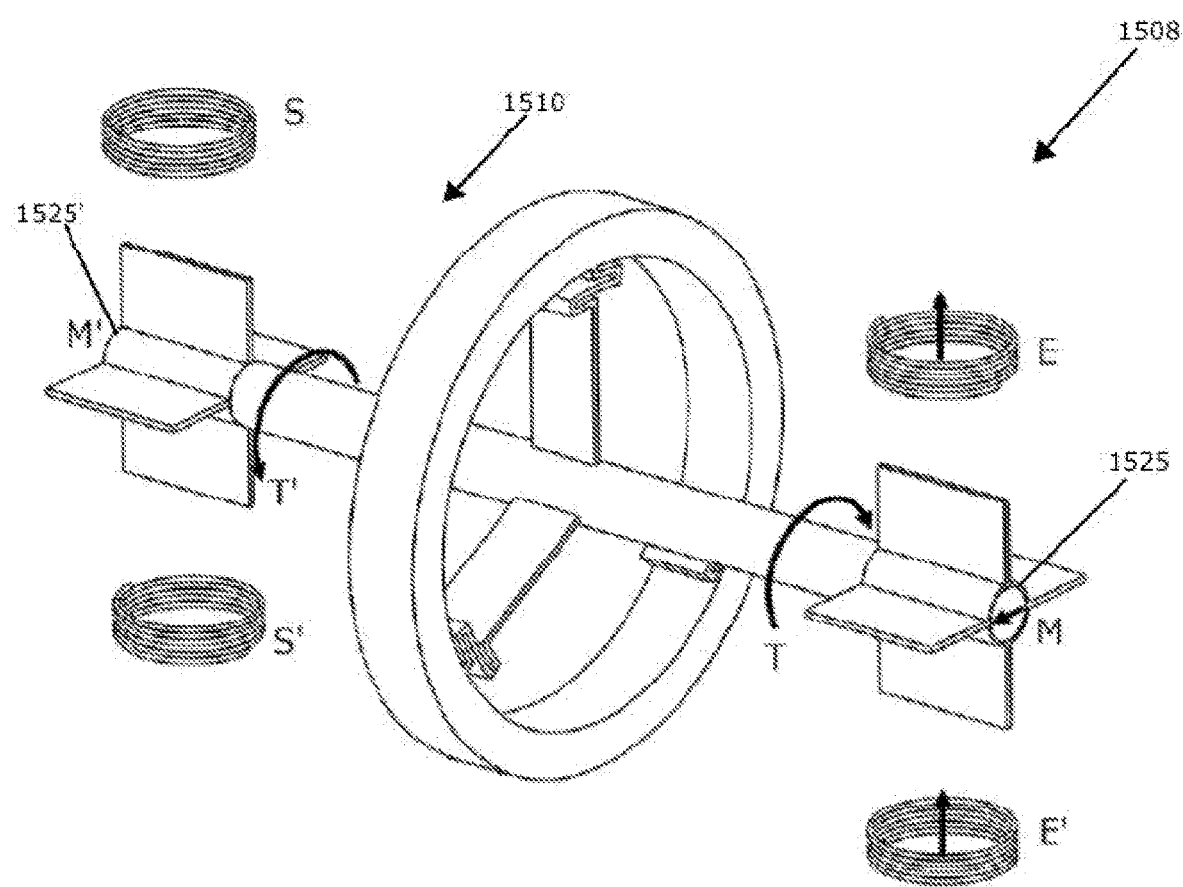
FIG. 15 is an illustrative embodiment of a complete fluid properties sensor using the transducer method of FIG. 14.

Referring to FIG. 15, excitation coils (electromagnets) E-E are connected to an excitation source (not shown) that is capable of driving a current through E-E at the resonant frequency of the resonator 1510. This applies a force to magnet M to produce an oscillating torque, T, at the driven end 1525 of the resonator 1510 that produces a torsional oscillation in the resonator 1510. The sensed end 1525' (opposed to driven end 1525), when resonator 1510 is vibrating in the preferred antisymmetric mode, oscillates in the opposite sense to the driven end 1525, as is shown by torsional response T'. The oscillating field produced by magnet M' induces a current in the sense coils S-S', which current can be evaluated by an electronics unit (not shown) to calculate the desired properties of the fluid under test.

Figure 16:
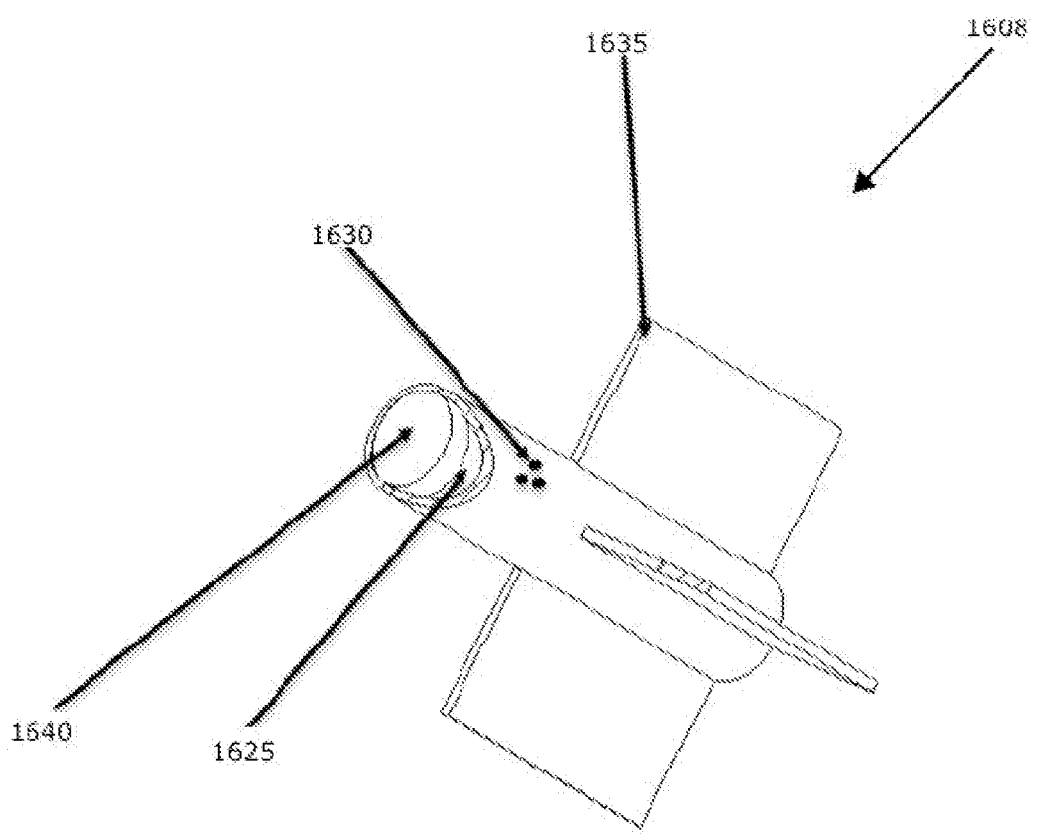
FIG. 16 shows an arrangement of a magnet confined to a boss attached to a set of fins.

If M and M' are permanent magnets, then they will tend to attract any ferro- or ferrimagnetic particles present in the test fluid. A collection of particles on the sensor will eventually influence its resonant frequency and damping, thereby introducing unpredictable errors into the measurement. One preferred method for minimizing these errors is to confine the magnets 1625 to a boss whose diameter is substantially smaller than the circle encompassing the fins, as shown in FIG. 16 which shows only the modified fluid end with a cap 1640.

Magnetic particles 1630 will accumulate on the extended boss where they have a much smaller effect on the sensor. A mass, such as a magnetized particle, stuck to a fin 1635, furthest from the axis, would have the greatest effect on the sensor.

A second approach is to replace the permanent magnets with soft magnetic slugs which can be temporarily magnetized by an external bias field. An exemplary material for this purpose would be Permalloy 45, which has a very favorable combination of high permeability and high saturation magnetization, although any soft magnetic material would serve the purpose.

FIG. 17 shows a possible arrangement of coils that would serve to bias the soft magnetic slugs and to excite and sense the resulting vibrations. Elements B and B' are bias coils that can be energized with a direct current to induce a magnetic moment in the fluid end masses that contain the soft magnetic slugs. The resulting polarization is shown by the small arrow on the end of the resonator.

Although not shown in the diagram, any or all of the coils may be provided with ferro- or ferromagnetic cores to enhance the electromagnetic efficiency of the transducers. A particularly advantageous material for the cores is Ferroxcube 3C97 ferrite, which has a nearly constant permeability up to a temperature of 250° C., so that the transducer system would have constant electromagnetic efficiency up to a system design temperature of 225° C. It is also understood that the core material may be disposed so as to constitute a continuous magnetic path with less flux leakage, thereby increasing the electromagnetic efficiency of the system.

Figure 18:
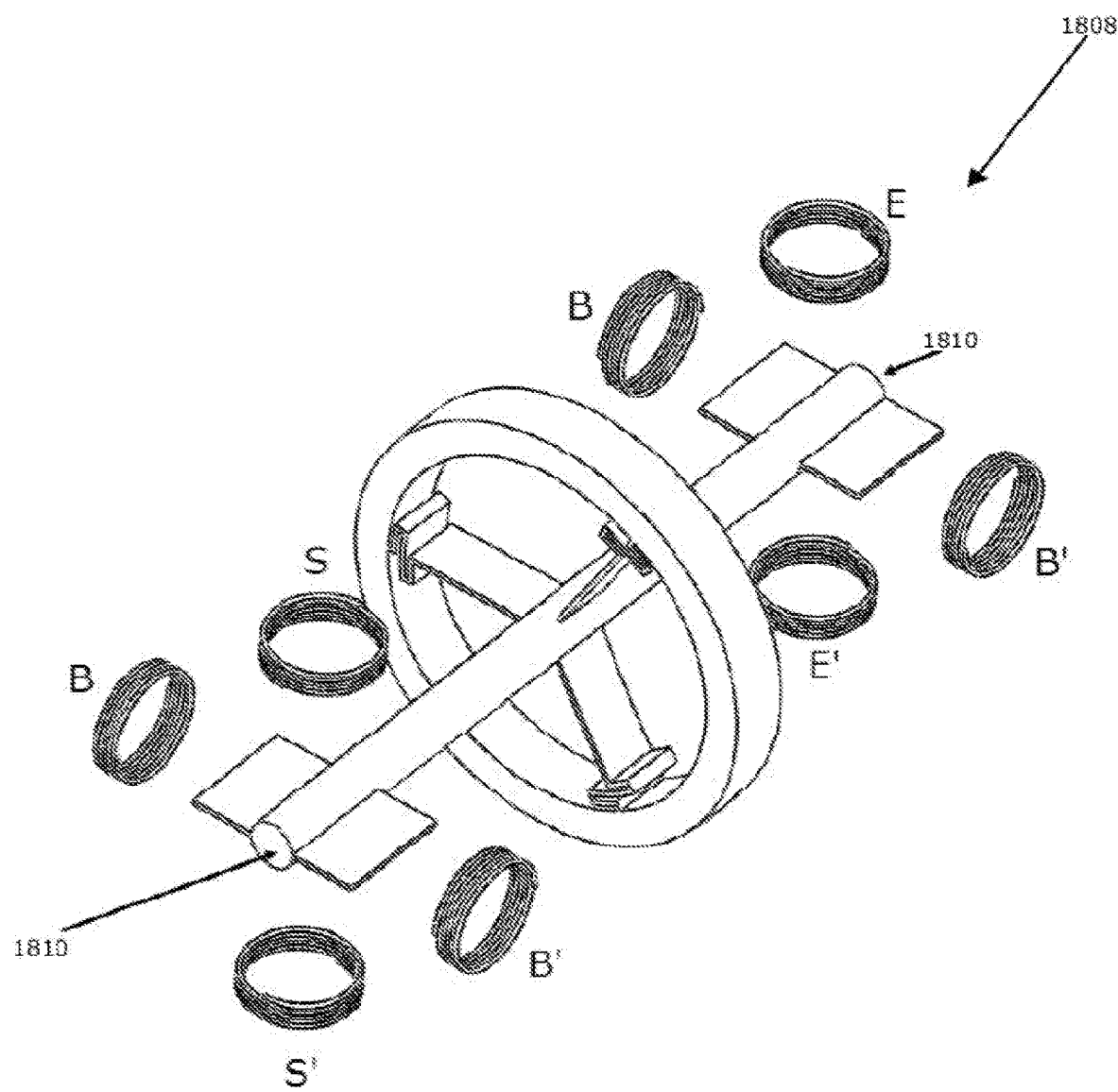
FIG. 18 shows an isometric view of an alternate embodiment of a resonator mounted to a mounting ring, and a set of electromagnets to drive and sense the resonator.

In an alternative preferred embodiment, the resonator itself is made of a soft magnetic but simultaneously corrosion resistant material, so that the entire resonator structure may be made of a single piece of material. Suitable materials include the martensitic stainless steels, as well as 17-4 PH and related alloys. FIG. 18 shows such a mounted resonator, preferentially having a resonator body 1810 made of soft magnetic material as well as two, four or any even number of fins so that the bias coils induce a symmetric field in the fluid end.

Many other arrangements are possible. For example, in one embodiment the electromagnets (coils) are placed in the resonator, with the permanent magnets or soft magnetic material supported near the resonator, by a frame. Also, in an alternative embodiment, the resonator is excited by an electromagnetic assembly or by a piezoelectric element and is sensed optically or piezoelectrically.

Figure 19:
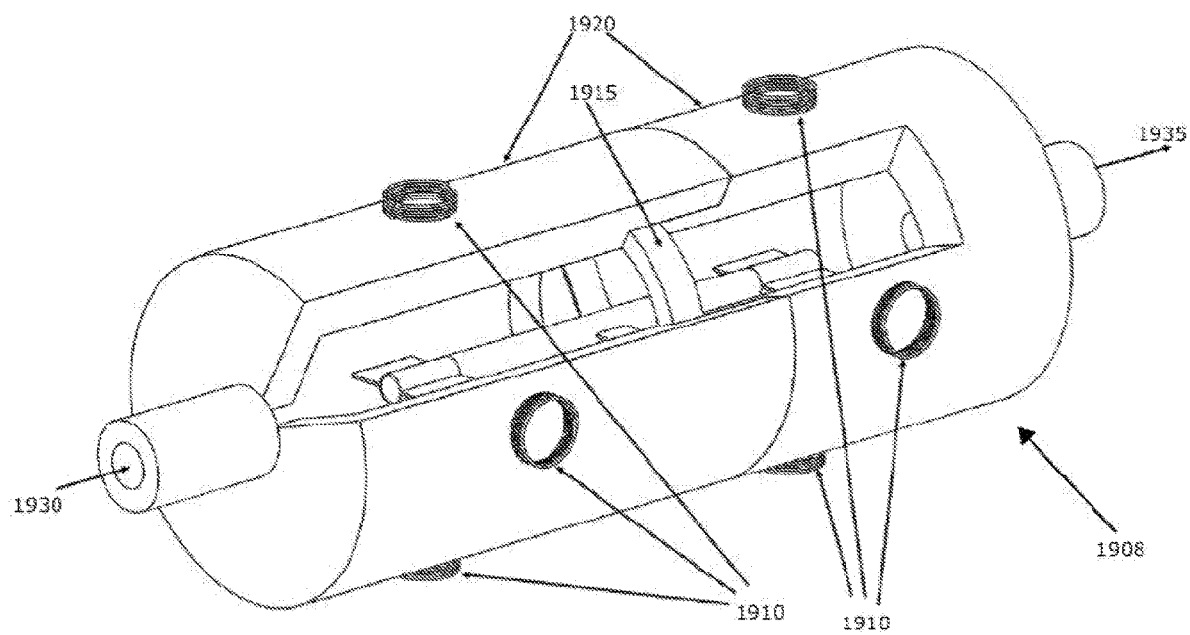
FIG. 19 shows an isometric cut-away view of a fluid properties measurement device, having a measurement cell used to contain high pressure fluid in contact with a resonator.

FIG. 19 shows a schematic rendering of a typical measurement cell 1920 used to contain high pressure fluid in contact with the resonator 1915. The high pressure fluid enters measurement cell 1920 through fluid inlet 1930 and exits measurement cell 1920 through fluid outlet 1935. It also has means to clamp the resonator 1915 rigidly in position in the cell, as well as coils 1910 for excitation, biasing and sensing. The coils 1910 are shown schematically as applied to the outer surface of the cell, although they would typically be recessed in pockets in the surface of the cell 1920.

Figure 20:
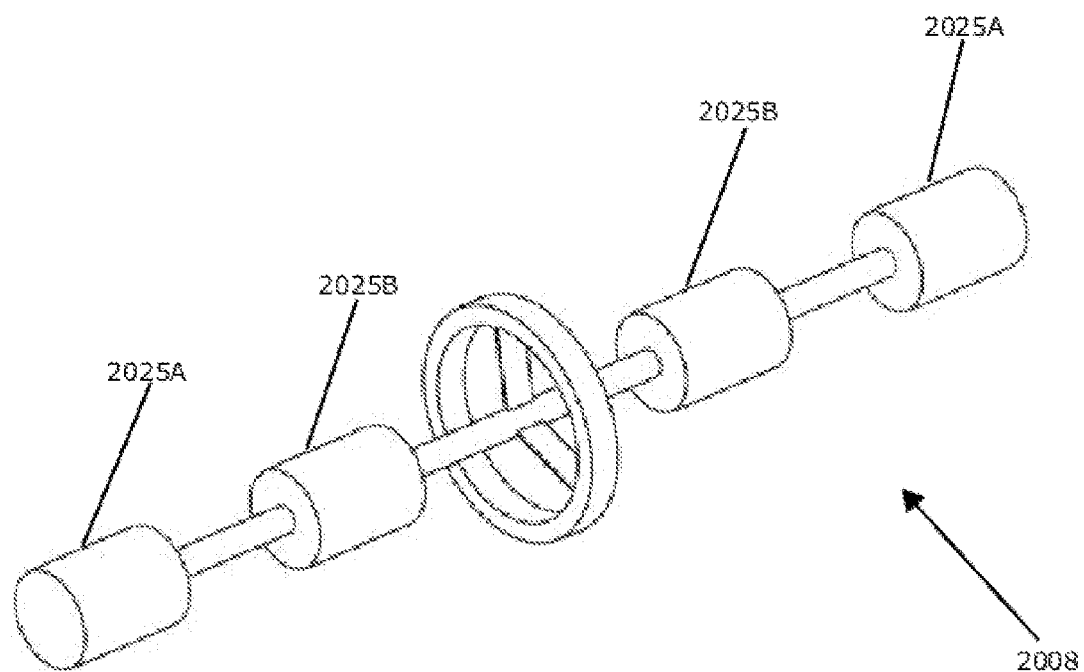
FIG. 20 shows an isometric view of a resonator, for use in an embodiment of a fluid properties measurement device, and having four torsional masses.

Referring to FIG. 20, in a further alternative preferred embodiment a resonator 2008, includes two intermediate masses 2025B, complementing two end masses 2025A. Skilled persons will recognize that an arbitrarily large number of masses can be spaced apart longitudinally on the torsional springs, with a greater number of masses yielding a greater number of vibrational modes. In addition, masses such as masses 2025A and 2025B, can include fins in any of the arrangements shown in the earlier figures.

Figure 21:
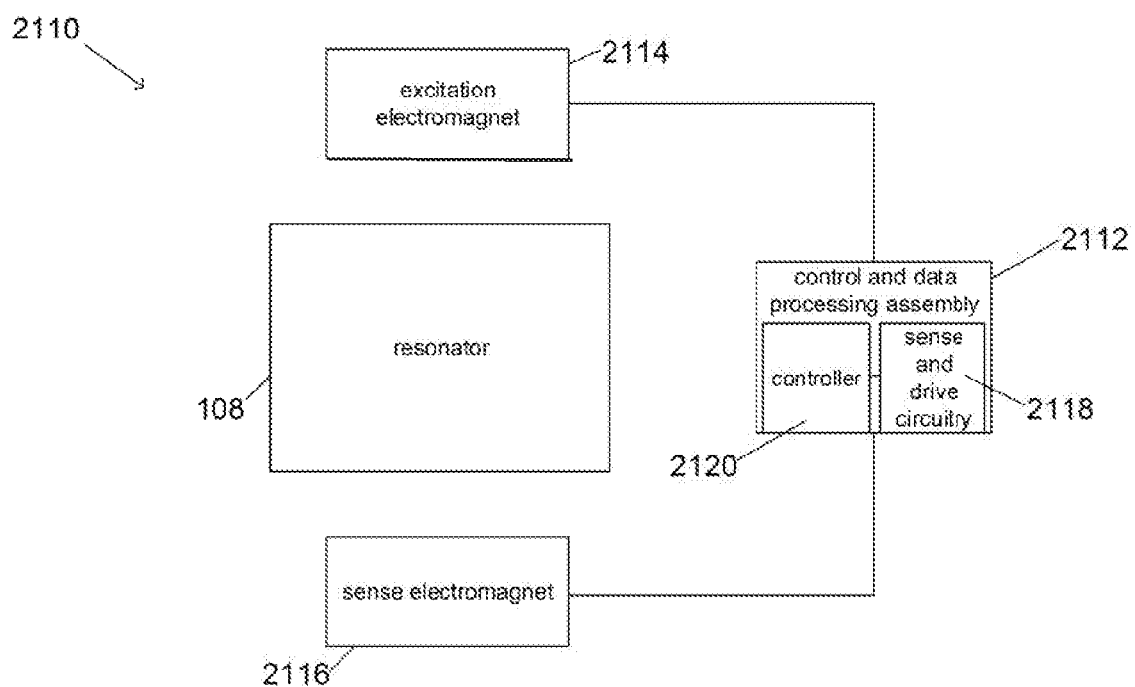
FIG. 21 is a block diagram of an embodiment of a fluid properties measurement device according to the present invention.

Referring to FIG. 21, a complete fluid properties measurement device 2110 further includes a control and signal processing network 2112, programmed to both excite the resonator 108 by way of the excitation coils (also known as electromagnets) 2114 and analyze the sensed signal from the sense coils 2116. Many algorithms for the analysis, with many specifically directed to fluid density, are detailed in the literature. Coils 2114 and 2116 would generally have the physical appearance of coils 1910, and be electrically connected to an electrical network of driving and sense circuitry 2118, controlled by a microprocessor 2120, which together make up the control and signal processing network 2112. The data processing can be performed in a manner described in U.S. Pat. No. 8,752,416.

A further summary of embodiments follows:

A fluid properties measurement device, comprising: a resonator defining a lengthwise axis and having a central vibrational node, and at least one pair of opposed lengthwise end-portions; a support structure including a frame and a set of flexible supports extending from the frame to the central vibrational node of the resonator and thereby supporting the resonator at the vibrational node; a driving and sensing assembly, adapted to drive the resonator to resonant motion and to sense resultant motion of the resonator and producing a motion sensed signal, responsive thereto; and a control and signal processing network adapted to control the driving and sensing assembly to drive the lengthwise end-portions in torsional vibration about the lengthwise axis, in opposed rotational directions, and responsive to the motion sensed signal to determine at least one fluid property of a fluid under test in response to the motion sensed signal.

Variants of this embodiment include: wherein the driving and sensing assembly includes magnetic material and an opposed electromagnetic assembly supported by the device and wherein the electromagnet assembly is controlled to drive the resonator in torsional motion and to sense resultant torsional motion of the resonator; wherein the magnetic material is supported in at least one end region of the resonator and the electromagnet assembly is supported by the frame, in opposed relationship to the magnetic material; wherein the magnetic material is supported in at least an opposed pair of end regions, and the electromagnet assembly includes at least a pair of electromagnets, each opposed to one of the pair of end regions; wherein the at least one pair of electromagnets is a first pair of electromagnets and further including a second pair of electromagnets opposed to the first pair of electromagnets, and spaced apart from the first pair of electromagnets by the end regions of the resonator; wherein the magnetic material is soft magnetic material, which can be temporarily magnetized by an external bias field, and further wherein the electromagnetic assembly is positioned and controlled to magnetize the soft magnetic material; wherein the resonator is made of soft magnetic material, which can be temporarily magnetized by an external bias field, and further wherein the electromagnetic assembly is positioned and controlled to magnetize at least a portion of the soft magnetic material; wherein the magnetic material comprises permanent magnets set into the end-portions and positioned so as to minimize the effect of an accretion of magnetically attracted particles near to the permanent magnets; wherein the flexible supports include serpentine sections; wherein the end-portions are expanded in width relative to the midpoint; wherein at least one pair of the opposed end-portions include radially outwardly extending fins; wherein the end-portions further include a core that is cylindrical in cross-section, and wherein the fins extend outwardly from the core and are thicker at the area where they meet the core than at their radially outmost edges; wherein the end-portions are round in cross-section; wherein the end-portions are polygonal in cross-section; and wherein each end portion includes at least one intermediate mass and an end mass, the masses mutually separated by lengths of torsional spring, whereby the resonator can be caused to vibrate in a plurality of vibrational modes, each having its own resonant frequency.

A method of measuring a fluid property, comprising: providing a measurement assembly, including a resonator having a pair of opposed lengthwise end-portions joined together by a torsional spring and defining a lengthwise axis and having a central vibrational node; a support structure including a frame and a set of flexible supports extending from the frame to the central vibrational node of the resonator and thereby supporting the resonator at the lengthwise midpoint; placing the measurement assembly into a fluid; driving at least one end-portion in torsional vibration about the lengthwise axis, sensing resultant resonator motion and producing a motion sensed signal, responsive thereto; and using the motion sensed signal to determine at least one fluid property of the fluid.

Variants of this embodiment include: wherein the resonator is driven magnetically, with a varying magnetic field produced by an electromagnetic assembly creating a force applied to magnetic material; wherein the at least one end-portion includes magnetic material and is driven by a first set of electromagnetics supported near the at least one end-portion; wherein the magnetic material is soft magnetic material and is maintained in a magnetized state, by a biasing electromagnetic field, produced by the electromagnetic assembly; further including sometimes changing the biasing electromagnetic field, to change the magnetized state of the soft magnetic materials, such that any particles magnetically attracted to the soft magnetic materials and sticking to the resonator will be freed and permitted to flow away in the fluid; wherein the magnetic materials are permanent magnets; wherein a first end-portion is driven and motion of a second end-portion, opposed to the first end-portion, is sensed; wherein the resonator is torsionally balanced, with the end-portions rotating in mutually opposed motion; and wherein each end portion includes more than one mass, whereby the resonator has multiple resonant modes and multiple resonant frequencies, and wherein the method includes driving the resonator to torsionally vibrate in a first resonant mode having a first resonant frequency, and to gather sense signal data for the first resonant mode, and then to drive the resonator to torsionally vibrate in a second resonant mode having a second resonant frequency and to gather sense signal data for the second resonant mode, and to use the sensed signal data from both resonant modes in determining at least one fluid property.

In general overview, the above described embodiments improve on the prior art by making use of a single balanced resonator with a highly compliant mounting, in preference to the coupled torsional resonators described in the Background section. Minor differences in the moments of inertia of the two ends of the resonator produce axial displacement of the node. But the highly compliant mounting compensates for this displacement. A second advantage of the above described embodiments is that the highly compliant mounting results in a frequency separation between the mirror-symmetric and antisymmetric modes of at least several kilohertz, thereby avoiding the problem of confusion between these two resonant modes.

INDUSTRIAL APPLICABILITY

The present invention finds industrial applicability in the field of manufacturing fluid property measurement devices and in the monitoring of fluid properties and/or effects of fluids on surrounding structures.

The invention claimed is:

1. A fluid properties measurement device, comprising:
   (a) a torsionally balanced resonator defining a lengthwise axis and having a central vibrational node, and at least one pair of opposed lengthwise end portions;
   (b) a support structure including a frame and a set of flexible supports extending from said frame to said central vibrational node of said resonator and thereby supporting said resonator at said vibrational node;
   (c) a driving and sensing assembly, adapted to drive said resonator to resonant motion and to sense resultant motion of said resonator and producing a motion sensed signal, responsive thereto;
   (d) a control and signal processing network adapted to control said driving and sensing assembly to drive said lengthwise end portions in torsional vibration about said lengthwise axis, in opposed rotational directions, and responsive to said motion sensed signal to determine at least one fluid property of a fluid under test in response to said motion sensed signal; and
   (e) wherein said device is constructed to permit fluid entry and fluid immersion of all said end-portions.

2. The fluid properties measurement device of claim 1, wherein said driving and sensing assembly includes magnetic material and an opposed electromagnetic assembly supported by said frame and wherein said electromagnet assembly is controlled to drive said resonator in torsional motion and to sense resultant torsional motion of said resonator.

3. The fluid properties measurement device of claim 2, wherein said magnetic material is supported in at least one said end region of said resonator and said electromagnet assembly is supported by said frame, in opposed relationship to said magnetic material.

4. The fluid properties measurement device of claim 3, wherein said magnetic material is supported in at least an opposed pair of end regions, and said electromagnet assembly includes at least a pair of electromagnets, each opposed to one of said pair of end regions.

5. The fluid properties measurement device of claim 4, wherein said at least one pair of electromagnets is a first pair of electromagnets and further including a second pair of electromagnets opposed to said first pair of electromagnets, and spaced apart from said first pair of electromagnets by said end regions of said resonator.

6. The fluid properties measurement device of claim 2, wherein said magnetic material is soft magnetic material, which can be temporarily magnetized by an external bias field, and further wherein said electromagnetic assembly is positioned and controlled to magnetize said soft magnetic material.

7. The fluid properties measurement device of claim 2, wherein said resonator is made of soft magnetic material, which can be temporarily magnetized by an external bias field, and further wherein said electromagnetic assembly is positioned and controlled to magnetize at least a portion of said soft magnetic material.

8. The fluid properties measurement device of claim 2, wherein said magnetic material comprises permanent magnets set into said end portions and positioned so as to minimize the effect of an accretion of magnetically attracted particles near to said permanent magnets.

9. The fluid properties measurement device of claim 1, wherein said flexible supports include serpentine sections.

10. The fluid properties measurement device of claim 1, wherein a resonator midpoint is defined halfway between said end portions and wherein said end portions are expanded in width relative to said midpoint.

11. The fluid properties measurement device of claim 1, wherein at least one pair of said opposed end portions include radially outwardly extending fins.

12. The fluid properties measurement device of claim 11, wherein said resonator includes a lengthwise cylindrical body joining and forming a portion of said end portions, and wherein said fins extend outwardly from said body and are thicker at the area where they meet said body than at their radially outmost edges.

13. The fluid properties measurement device of claim 1, wherein said end portions are round in cross section.

14. The fluid properties measurement device of claim 1, wherein said end portions are polygonal in cross section.

15. The fluid properties measurement device of claim 1, wherein each end portion includes at least one intermediate mass and an end mass, said masses mutually separated by lengths of torsional spring, whereby said resonator can be caused to vibrate in a plurality of vibrational modes, each having its own resonant frequency.

16. A method of measuring a fluid property, comprising:
   (a) providing a measurement assembly, including:
      (i) a torsionally balanced resonator having a pair of opposed lengthwise end portions joined together by a torsional spring and defining a lengthwise axis and having a central vibrational node and a lengthwise midpoint, halfway between said end portions;
      (ii) a support structure including a frame and a set of flexible supports extending from said frame to said central vibrational node of said resonator and thereby supporting said resonator at said lengthwise midpoint; and
      (iii) said measurement assembly permitting fluid entry and immersion of all said end-portions;
   (b) placing said measurement assembly into a fluid, thereby permitting fluid to immerse all said end points;
   (c) driving at least one said end portion in torsional vibration about said lengthwise axis, causing said end-portions to rotate in mutually opposed motion and sensing resultant resonator motion and producing a motion sensed signal, responsive thereto; and
   (d) using said motion sensed signal to determine at least one fluid property of said fluid.

17. The method of claim 16, wherein said resonator is driven magnetically, with a varying magnetic field produced by an electromagnetic assembly creating a force applied to magnetic material.

18. The method of claim 17, wherein said at least one end portion includes magnetic material and is driven by a first set of electromagnetics supported near said at least one end portion.

19. The method of claim 18, wherein said magnetic material is soft magnetic material and is maintained in a magnetized state, by a biasing electromagnetic field, produced by said electromagnetic assembly.

20. The method of claim 19, further including sometimes changing said biasing electromagnetic field, to change said magnetized state of the soft magnetic materials, such that any particles magnetically attracted to said soft magnetic materials and sticking to said resonator will be freed and permitted to flow away in said fluid.

21. The method of claim 18, wherein said magnetic material is permanent magnet material.

22. The method of claim 17, wherein a first end portion is driven and motion of a second end portion, opposed to said first end portion, is sensed.

23. The method of claim 17, wherein said resonator is torsionally balanced, with said end portions rotating in mutually opposed motion.

24. The method of claim 17, wherein each said end portion includes more than one mass, whereby said resonator has multiple resonant modes and multiple resonant frequencies, and wherein said method includes driving said resonator to torsionally vibrate in a first resonant mode having a first resonant frequency, and to gather sensed signal data for said first resonant mode, and then to drive said resonator to torsionally vibrate in a second resonant mode having a second resonant frequency and to gather sensed signal data for said second resonant mode, and to use said sensed signal data from both resonant modes in determining at least one fluid property.

* * * * *